United States Patent [19]

Hoyois

[11] Patent Number: 4,487,197
[45] Date of Patent: Dec. 11, 1984

[54] SOLAR CONTROL PANEL

[75] Inventor: Jean-Claude Hoyois, Ham-sur-Heure, Belgium

[73] Assignee: Glaverbel, Brussels, Belgium

[21] Appl. No.: 371,476

[22] Filed: Apr. 23, 1982

[30] Foreign Application Priority Data

Apr. 29, 1981 [GB] United Kingdom ................. 8113181

[51] Int. Cl.³ .............................................. F24J 3/02
[52] U.S. Cl. ..................... 126/901; 350/1.6; 350/1.7; 428/433
[58] Field of Search ................. 350/1.1, 1.6, 1.7, 261; 428/433, 434; 126/450, 901

[56] References Cited

U.S. PATENT DOCUMENTS

| 2,854,349 | 9/1958 | Dreyfus et al. | 350/1.6 |
| 3,514,175 | 5/1970 | Jenkins | 350/1.6 |
| 3,781,077 | 12/1973 | Groth | 350/1.7 |
| 3,846,152 | 11/1974 | Franz | 350/1.7 |
| 4,160,061 | 7/1979 | Okino et al. | 350/1.6 |
| 4,272,588 | 6/1981 | Yoldas et al. | 428/433 |

Primary Examiner—Samuel Scott
Assistant Examiner—Noah Kamen
Attorney, Agent, or Firm—Spencer & Frank

[57] ABSTRACT

A glazing panel for transmitting radiant energy including visible light energy which includes first and second glass sheets supported in spaced relation. The first glass sheet has an oxide coated surface which defines an exterior surface of the panel and a gold coating on the surface which faces the second glass sheet.

4 Claims, 4 Drawing Figures

FIG. 1
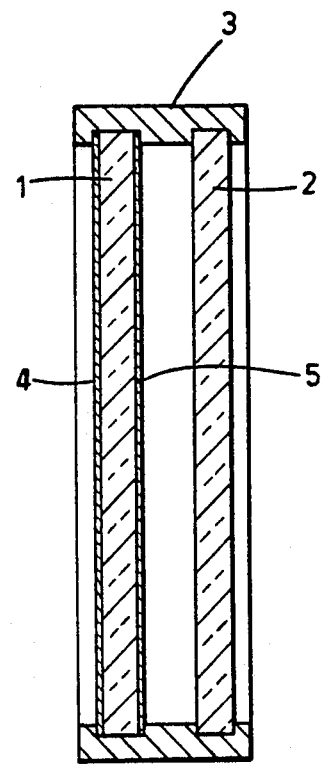
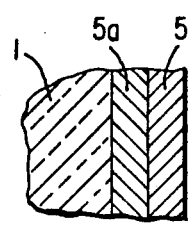
FIG. 2
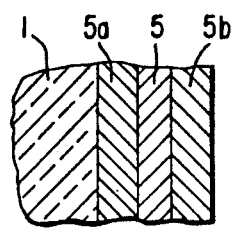
FIG. 3
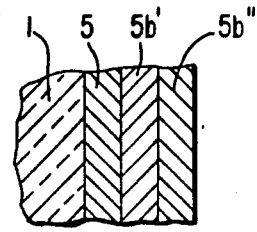
FIG. 4

SOLAR CONTROL PANEL

BACKGROUND OF THE INVENTION

This invention relates to a glazing panel comprising clear glass panes held in spaced facing relationship and incorporating a coating on an exterior glass surface of the panel for solar shading purposes.

Such panels are known wherein one of the exterior glass faces bears a coating which is capable of screening off a proportion of incident solar radiation. When used as a window with the coated exterior face to the outside of the building the coating reduces the glare and/or the heating effect of strong sunlight at the building interior.

Such an external coating can be formed of one or more oxides. Oxide coatings can provide a useful shading effect against solar radiation while having an adequate visible light transmissivity to meet most glazing requirements. Such oxide coatings can have a fairly high abrasion resistance and they can be formed on large areas of glass with a high degree of uniformity. These potentialities of oxide coatings are well known in the art of coated glass manufacture and various oxide coatings are in actual use.

A disadvantage of such optical oxide coatings is the heating effect associated with their screening function. The solar shading afforded by such coatings is appreciably dependent on their absorption of light and/or infra-red radiation. This energy absorption results in heating of the coated pane and the re-emission of energy as long wavelength infra-red radiation. Some of this re-emitted energy is radiated towards the interior of the panel, i.e. towards the interior of the building, and consequently detracts from the overall shading efficiency of the panel.

The adverse effects of the energy absorption by the external coating can be reduced by screening off the infra-red radiation emitted internally from the coated exterior pane, e.g. by a suitable optical coating on the next pane. It is theoretically better however to coat the inside face of the oxide-coated pane itself in order to reduce the infra-red emission from that face. In practice however there are problems in reconciling the provision of such an internal coating with required performance specifications of the panel if these specifications require its luminous transmission factor to be high having regard to its total energy transmission factor.

As used in this specification the term "luminous transmission factor" denotes a ratio of the quantity of visible transmitted light to the quantity of incident visible light, such quantities being corrected integrations of the transmitted and incident light values respectively over the whole spectral range of visible light, the integrations being corrected to compensate for the spectral distribution of the radiant energy source and for the spectral sensitivity characteristics of the human eye. The measurements are made with a spectrophotometer and using a light source whose spectral composition is that of Illuminant D 65 as defined by the International Commission on Illumination (reference CIE 17 Sections 45-15-145). This illuminant represents daylight with a colour temperature of about 6504 K. The eye sensitivity correction factor applied is likewise that which is standardised by the International Commission on Illumination.

The term "total energy transmission factor" as used herein denotes the ratio of transmitted radiant energy to incident radiant solar energy. The term "energy absorption factor" as used herein denotes the fraction of incident radiant solar energy which is absorbed. For the determination of both of these factors use is made of a radiator whose spectral composition is that of direct sunlight at an elevation of 30° above the horizon. The spectral composition is given by Moon's Table for a mass of air equal to 2. The energy absorption factor of a coated glass pane as referred to in this specification, like the total energy transmission factor of a panel, is always measured with the face bearing the energy-absorbing coating directed towards the radiant energy source. The luminous transmission factor is not dependent on whether the face bearing said energy-absorbing coating is directed towards or away from the light source.

SUMMARY OF THE INVENTION

The present invention enables a panel comprising clear glass panes to have a very favourable combination of said luminous and total energy transmission factors to be achieved. The expression "clear glass" as used in this specification denotes glass of such composition that a 6 mm thick sheet of the glass has a luminous transmmission factor of at least 85%.

A panel according to the present invention is defined herebelow. The panel is characterised in that the external glass coating is an energy-absorbing oxide coating and in that a gold coating between 9 and 14.5 nm thick is present on the interior face of the pane bearing said oxide coating so that such gold coating is exposed to the interior of the panel.

The combination of coatings in accordance with the invention affords notable advantages. The use of gold for forming optical coatings is known per se but its use in the manner required by the invention enables a multiple glazing panel to possess a combination of properties which are distinctive and not attainable by panels produced in accordance with prior published proposals in this field. In particular, infra-red emissivity of the gold-coated face is reduced to a surprising degree in relation to the screening of visible light by the coating. A clear glass pane bearing on one side a gold coating between 9 and 14.5 nm in thickness can have a luminous transmission factor of at least 60% even with an emissivity of the gold coating of not more than 0.25. This advantage can be realised in a panel according to the invention without involving any objectionable modification of the colour of the panel viewed by reflected or transmitted light.

The attainment of the foregoing optical properties by using gold for the low emissivity coating is of importance from the manufacturing standpoint because gold coatings of the requisite thickness can be formed to comply with very high standards of uniformity by established coating techniques. The gold coating is resistant to ageing and, being within the panel, it is protected from mechanical damage.

Preferably the properties of said oxide coating are such that the clear glass pane and such coating together have an energy absorption factor of at least 16%. The benefits of using a gold coating in accordance with the invention are particularly significant in such cases.

Oxide coatings having good solar screening properties can as known per se nevertheless have a reasonably good visible light transmissivity. The relationship between the luminous transmission and total energy transmission factors of a panel according to the invention can therefore be very favourable.

In preferred embodiments of the invention, the glass panes and the coatings are composed so that the panel, when arranged with the oxide-coated face towards the radiant energy source, has a good energy absorbing property while also having a luminous transmission factor higher than its total energy transmission factor. The attainment of this condition, and substantially without modifying the apparent colour of the panel, is made possible by the employment of gold for the internal coating and by giving the gold coating a thickness within the range hereinbefore specified.

For the energy-absorbing oxide coating it is preferred to employ a coating comprising one or more metal oxides selected from: tin, titanium, cobalt, iron and chromium oxides, and most preferably such a coating which comprises a mixture of cobalt, iron and chromium oxides. It is for example suitable to employ such a three-constituent coating wherein the cobalt, iron and chromium oxides are in a ratio of 62:26:12 by weight. A neutral colour energy-absorbing coating with a favourable luminous transmission factor can be formed by using a mixture of cobalt, iron and chromium oxides and a coating thickness of from 20 to 100 nm and preferably from 30 to 50 nm.

Preferably the gold coating has a thickness between 9 and 12 nm. This narrower range is recommended for avoiding or keeping to a minimum any colour modifying effect of the coating.

In some embodiments of the invention there is an undercoating beneath the gold coating. The quality of the gold coating can be improved by applying a suitable subbing layer to the glass. Preferably bismuth oxide is used for such undercoating.

It is possible to overcoat the gold coating instead of leaving it exposed to the interior of the panel, while still realising for the panel as a whole a favourable relationship between its luminous transmission factor and its total energy transmission factor. Accordingly, the invention includes a panel incorporating the invention as hereinbefore defined but with the modification that the gold coating is overcoated by another light-transmitting layer or layers. A pane bearing such layers may have a luminous transmission factor greater than when using the gold layer alone. Preferably the gold-coated glass pane and the coating layers on its gold-coated face together have a luminous transmission factor of at least 60%. Preferred panels according to the said modification of the invention, when arranged with the oxide-coated face towards the radiant energy source, have a luminous transmission factor higher than their total energy transmission factor.

For forming an over-coating on the gold layer it is suitable to employ $Bi_2O_3$, ZnO, ZnS, or $TiO_2$.

In the case that the gold coating is over-coated by one or more further light-transmmitting layers it is possible to achieve a relatively high luminous transmission factor in relation to a given total energy transmission factor while using a gold coating of a thickness which would not otherwise enable that condition to be achieved. Accordingly the present invention also includes a panel as defined herebelow. Such a panel is characterised in that the external coating is an energy-absorbing oxide coating, in that on the interior face of the pane bearing said oxide coating there is a second coating which comprises a layer of gold covered by at least one further light-transmitting layer; and in that the composition of the glass sheets and the compositions and thicknesses of said energy-absorbing coating and said second coating layers are such that the panel, when arranged with said oxide-coated face towards the radiant energy ssource, has a luminous transmission factor higher than its total energy transmission factor. The oxide coating in such a panel preferably has properties such that the oxide coating and the pane bearing it together have an energy absorption factor of at least 16%. Preferably the gold-coated pane and the coating layers on its gold-coated face together have a luminous transmission factor of at least 60%.

Suitable materials for use in over-coating the gold layer are specified above.

BRIEF DESCRIPTION OF THE DRAWING

Certain embodiments of the invention, selected by way of example, will now be described with reference to the accompanying drawing FIG. 1 is a cross-sectional view of the basic structure of a panel according to the invention.

FIG. 2 is a cross-sectional detail view of a first embodiment of the structure of FIG. 1.

FIG. 3 is a cross-sectional detail view of a second embodiment of the structure of FIG. 1.

FIG. 4 is a cross-sectional view of a third embodiment of the structure of FIG. 1.

DESCRIPTION OF THE PREFERRED EMBODIMENTS

The illustrated panel comprises two sheets of clear glass, 1, 2 held in spaced relation by a frame 3. The panel is intended to be used as a glazing unit with sheet 1 to the outside of the building.

Sheet 1 bears on its outer face an energy-absorbing light-transmitting coating 4. This coating is a metal oxide coating. It is responsible for a part of the solar shading property of the panel. The oxide coating and the glass sheet 1 are preferably composed so that they together have a luminous transmission factor of at least 40%, a total energy transmission factor of not more than 60% and an energy absorption factor of at least 16%.

The internal face of sheet 1 bears a gold coating 5. The sheet 1 and its gold coating together have a luminous transmission factor of at least 60%. A subbing layer 52, shown in FIGS. 2 and 3, e.g. a layer of bismuth oxide, may be provided beneath the gold coating. An overcoating may also be provided on gold coating 5. The overcoating may be a single layer 5b as shown in FIG. 3 or a plurality of layers 5b' and 5b" as shown in FIGS. 3 and 4.

The following Examples 1, 2, 4, 5 are examples of panels according to the invention and constructed as described with reference to the drawing. Example 3 is for comparison purposes.

EXAMPLE 1

The sheets 1 and 2 were sheets of ordinary clear float glass having a thickness of 4 mm and 8 mm respectively.

The energy-absorbing coating 4 was a mixture calculated as comprising 62% CoO, 26% $Fe_2O_3$ and 12% $Cr_2O_3$ and had a thickness between 35 and 45 nm. The energy absorption factor of sheet 1 together with the oxide coating was 22%.

The gold coating 5 had a thickness of 11–12 nm and was formed on top of a bismuth oxide subbing layer 1.5–2 nm in thickness. The gold coating had an emissivity of about 0.2 and the luminous transmission factor of the sheet 1 together with the gold coating was about 60%.

The panel as a whole had a luminous transmission factor of 24.1% and a total energy transmission factor (measured with coating 4 facing the radiant energy source) of 23.3%. A luminous transmission factor of 24.1%, considered in isolation, is not a high value but having regard to the total energy transmission factor of 23.3% it is appreciably higher than can be attained by using low emissivity coatings as hitherto proposed.

The panel was of neutral colour to ordinary observation, the gold coating having no perceptible colour modifying effect. The actual colour purity of the panel viewed in reflection was less than 3%. The term "colour purity" here refers to the colour purity reflected back from the sheet 1 when it is illuminated by Illuminant D 65 defined by the International Commission on Illumination (reference CIE 17 Section 45-15-145) from the side opposite said gold coating, the purity being determined in the manner therein specified.

EXAMPLE 2

The panel was the same as that according to Example 1 except that sheet 1 had a thickness of 6 mm and the gold coating 5 had a thickness of 9 nm. The gold coating had an emissivity of about 0.25. The sheet 1 and its gold coating together had a luminous transmission factor of 64%. The panel as a whole had a luminous transmission factor of 26.3% and a total energy transmission factor (measured with the oxide-coated face towards the radiant energy source) of 26.0%.

EXAMPLE 3 (COMPARATIVE)

The panel was the same as that according to Example 1 except that the gold coating 5 had a thickness of 7 to 8 nm. The sheet 1 and the gold coating together had a luminous transmission factor of 67%. The panel as a whole had a luminous transmission factor of 28.0% and a total energy transmission factor (measured with the oxide-coated face towards the radiant energy source) of 30.8%.

EXAMPLE 4

The sheets 1 and 2 were sheets of clear glass each 6 mm in thickness.

The energy-absorbing coating 4 was as in the preceding examples.

The coating 5 comprised an undercoating of $Bi_2O_3$, a gold coating and an overcoating of $Bi_2O_3$ covering the gold coating. The thicknesses of those three coatings were 2 nm, 16 nm and 34 nm respectively. The panel as a whole had a luminous transmission factor higher than its total energy transmission factor. The attainment of this result, notwithstanding the presence of the relatively thick gold coating, was attributable to the presence of the $Bi_2O_3$ overcoating. The actual values of the luminous and total energy transmission factors of the panel were 24% and 23% respectively.

Notwithstanding the use of a gold layer having a thickness of 16 nm the panel was of neutral colour to ordinary observation. The colour purity of the panel, measured as in the case of the panel according to Example 1, was not more than 3%. Because of the presence of the superposed interference layer, the gold coating could be increased in thickness up to about 16.5 nm without making it apparent to ordinary observation by the extent of its influence on the colour purity.

EXAMPLE 5

The sheets 1 and 2 were of clear glass and were respectively 4 mm and 6 mm in thickness.

The energy-absorbing coating 4 was again a three-constituent coating containing cobalt, iron and chromium oxides as indicated in Example 1. The thickness of this coating was again between 35 and 45 nm and the energy absorption factor of the sheet 1 and coating 4 was 22%.

The coating 5 was constituted by a 1 nm thick subbing layer of bismuth oxide with a 14 nm thick gold layer.

The sheet 1 and the bismuth oxide and gold coating 5 together had a luminous transmission factor of 52% and the gold coating had an emissivity of 0.09.

The panel as a whole had a luminous transmission factor of 20.6% and a total energy transmission factor of 18.7%. The colour purity of the panel measured as in the case of the panel according to Example 1 was 8%, the dominant wavelength of the reflected light being 578 nm.

In the foregoing Examples 1 to 5 the sheets 1 and 2 were sheets of untempered glass. One or both sheets can be tempered if desired.

EXAMPLE 6

The sheets 1 and 2 were of clear glass and were each 6 mm in thickness. The energy-absorbing coating 4 was as in Example 1.

The coating 5 was constituted by a 2 nm subbing layer of bismuth oxide with an 11 nm thick gold layer and an overcoating of bismuth oxide having a thickness of 31 nm.

The panel as a whole had a luminous transmission factor of 28.3% and a total energy transmission factor of 29.2% (measured with the coating 4 facing the radiant energy source).

The colour purity of the panel viewed in reflection (measured as in the case of the panel according to Example 1) was 4%, the dominant wavelength of the reflected light being 486 nm.

The colour of the panel viewed in reflection was slightly blue. The panel was slightly more blue to ordinary observation than a similar panel bearing the energy-absorbing layer only.

Such a panel affords a notable advantage: its colour (viewed in reflection) is the same as the colour (viewed in reflection) of a window basement constituted by a sheet of clear glass bearing on its back face a coating layer of neutral coloured enamel and on its front face, an oxide coating similar to coating 4.

Glazing panels according to the present example can thus advantageously be mounted in front wall of buildings in combination with such window basements to give to that wall a uniform colour, viewed in reflection. In the present example, sheets 1 and 2 are sheets of untempered glass, but one or both sheets can be tempered if desired.

I claim:

1. A glazing panel for transmitting radiant energy including visible light energy, comprising: first and second clear glass sheets; support means positioning said glass sheets in parallel spaced relation, such that one surface of said first glass sheet defines an exterior surface of said panel; a first coating on said one surface of said first glass sheet for providing solar shading, said first coating being an energy absorbing oxide coating;

and a second coating on the surface of said first sheet which faces said second sheet, said second coating being made of gold; wherein said first glass sheet has a thickness of 4 mm, said second glass sheet has a thickness of 6 mm, said first coating consists of 62%, CoO, 26% $Fe_2O_3$ and 12% $Cr_2O_3$ and has a thickness between 35 and 45 nm, said second coating has a thickness of 14 nm and an emissivity of 0.09, said panel further comprises an undercoating of bismuth oxide located on said first glass sheet beneath said second coating, said undercoating being 1 nm thick, said first glass sheet and said first coating together having an absorption factor of 22.0%, and said panel having a luminous transmission factor of 20.6%, a total energy transmission factor of 18.7% and a color purity when viewed in reflection of 8%.

2. A glazing panel for transmitting radiant energy including visible light energy, comprising: first and second clear glass sheets; support means positioning said glass sheets in parallel spaced relation, such that one surface of said first glass sheet defines an exterior surface of said panel; a first coating on said one surface of said first glass sheet for providing solar shading, said first coating being an energy absorbing oxide coating; and a second coating on the surface of said first sheet which faces said second sheet, said second coating being made of gold; wherein said first glass sheet has a thickness of 4 mm, said second glass sheet has a thickness of 8 mm, said first coating consists of 62% CoO, 26% $Fe_2O_3$ and 12% $Cr_2O_3$ and has a thickness of 35 to 45 nm, said second coating has a thickness between 11 and 12 nm and an emissivity of about 0.2, said panel further comprises an undercoating underlying said second coating, said undercoating is made of bismuth oxide and has a thickness between 1.5 and 2 nm, said first glass sheet and said second coating together have a luminous transmission factor of about 60%, and said panel has a luminous transmission factor of 24.1%, a total energy transmission factor of 23.3% when said first coating faces a radiant energy source, and a color purity when viewed in reflection of less than 3%.

3. A glazing panel for transmitting radiant energy including visible light energy, comprising: first and second clear glass sheets; support means positioning said glass sheets in parallel spaced relation, such that one surface of said first glass sheet defines an exterior surface of said panel; a first coating on said one surface of said first glass sheet for providing solar shading, said first coating being an energy absorbing oxide coating; and a second coating on the surface of said first sheet which faces said second sheet, said second coating being made of gold; wherein said first glass sheet has a thickness of 6 mm, said second glass sheet has a thickness of 8 mm, said first coating consists of 62% CoO, 26% $Fe_2O_3$ and 12% $Cr_2O_3$ and has a thickness of 35 to 45 nm, said second coating has a thickness of 9 nm and an emissivity of about 0.25, said panel further comprises an undercoating of bismuth oxide underlying said second coating and having a thickness of 1.5 to 2 nm, said first glass sheet and said second coating together have a luminous transmission factor of 64%, and said panel has a luminous transmission factor of 26.3% and a total energy transmission factor of 26% when said first coating faces a radiant energy source.

4. A glazing panel for transmitting radiant energy including visible light energy, comprising: first and second clear glass sheets; support means positioning said glass sheets in parallel spaced relation, such that one surface of said first glass sheet defines an exterior surface of said panel; a first coating on said one surface of said first glass sheet for providing solar shading, said first coating being an energy absorbing oxide coating; a second coating on the surface of said first sheet which faces said second sheet, said second coating being made of gold; and a light-transmitting layer overlying said second coating; wherein each said glass sheet has a thickness of 6 mm, said first coating consists of 62% CoO, 26% $Fe_2O_3$ and 12% $Cr_2O_3$ and has a thickness of 35 to 45 nm, said second coating has a thickness of 11 nm, said light-transmitting layer overlying said second coating is a bismuth oxide layer having a thickness of 31 nm, said panel further comprises an undercoating underlying said second coating, said undercoating is made of bismuth oxide and has a thickness of 2 nm, and said panel has a luminous transmission factor of 28.3%, a total energy transmission factor of 29.2% when said first coating faces a radiant energy source, and a color purity when viewed in reflection of 4%.

* * * * *